J. NORTHROP.
MISTHREADING DEVICE FOR LOOMS.
APPLICATION FILED APR. 17, 1914.
1,186,931. Patented June 13, 1916.
4 SHEETS—SHEET 2.
*Three Hopper Misthreads*
*Fig. 3.*
POSITION 1   POSITION 2
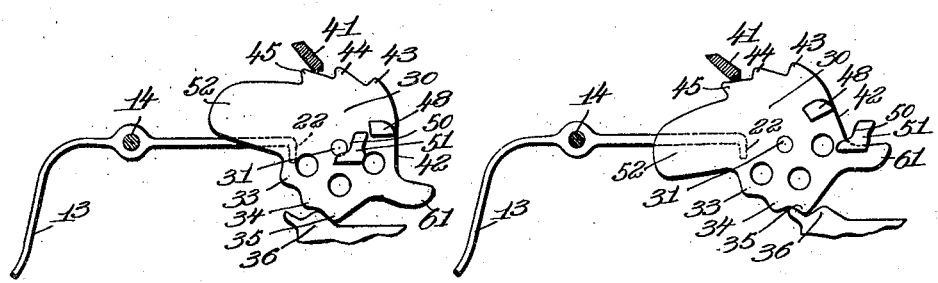
POSITION 3   POSITION 4
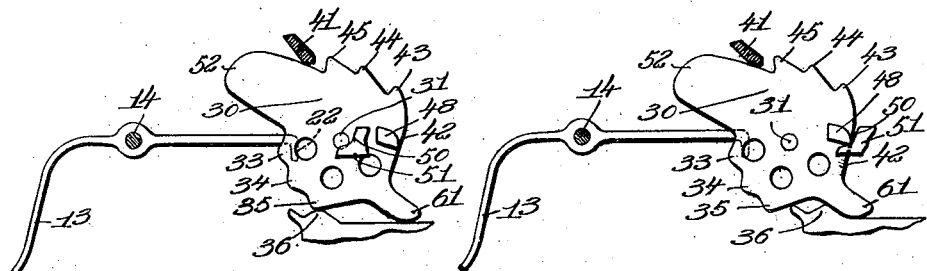
POSITION 5   POSITION 6
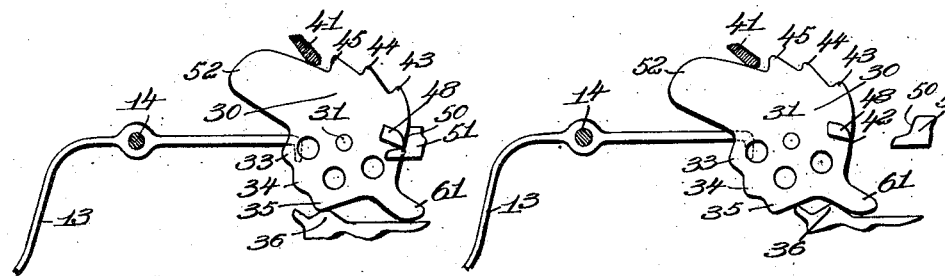
POSITION 7   POSITION 8
Witnesses  Inventor

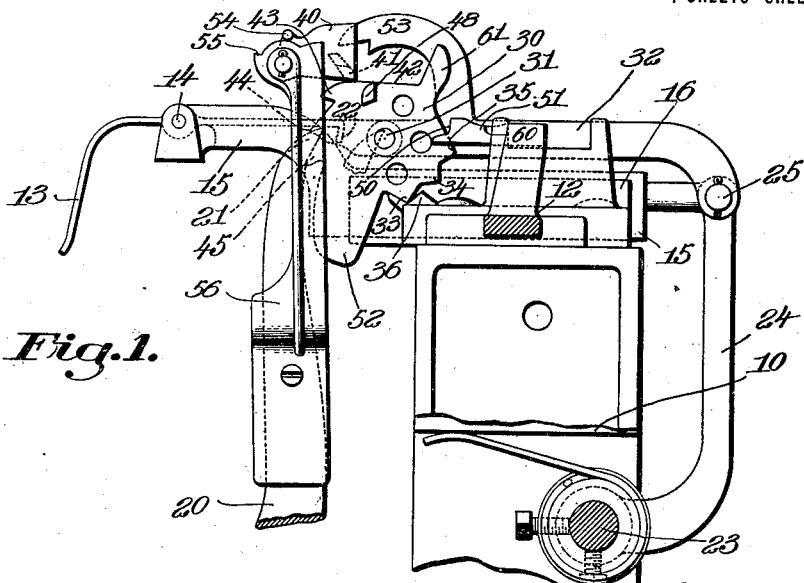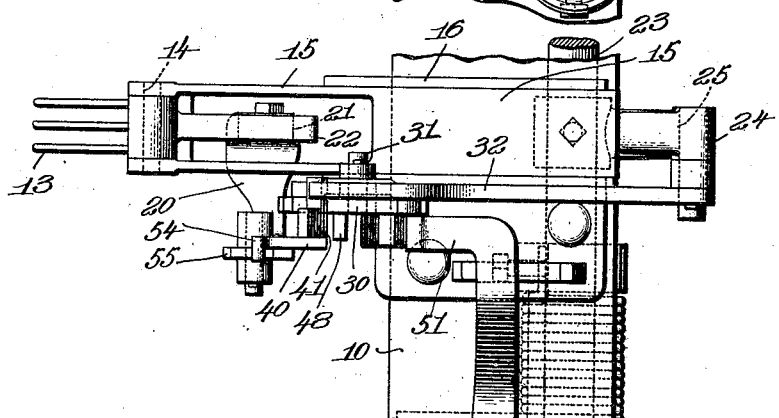

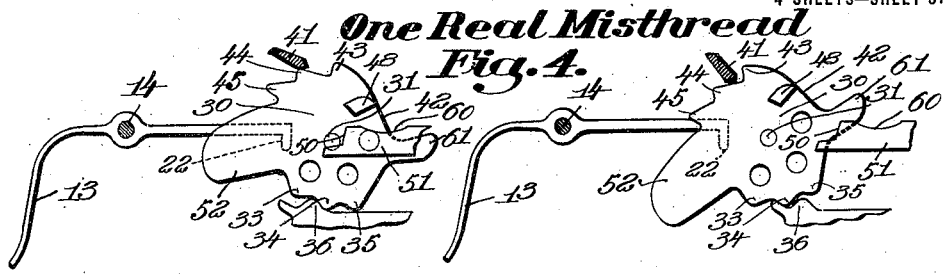
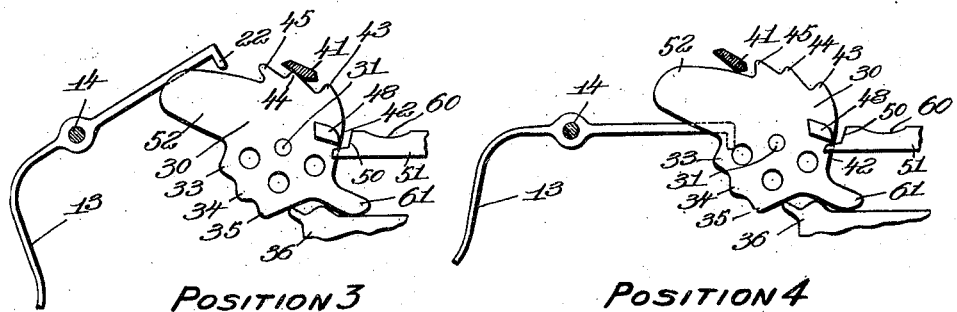
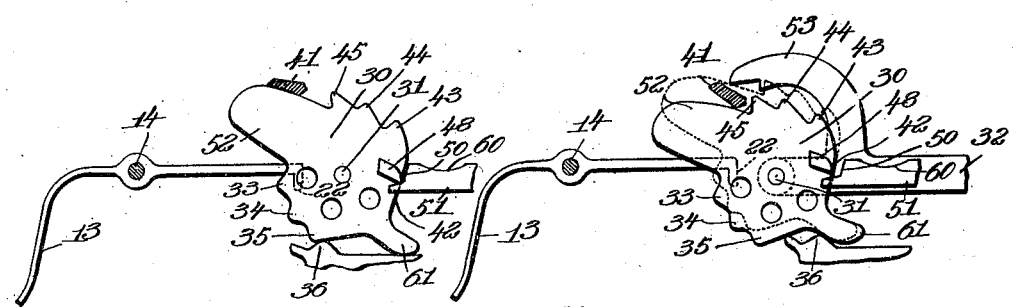
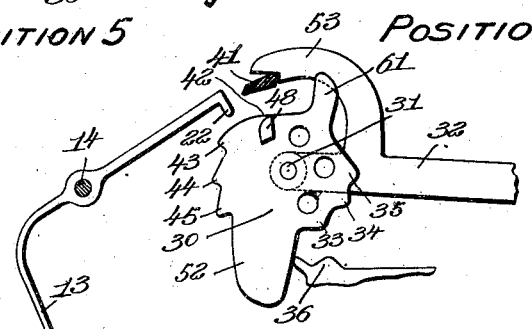

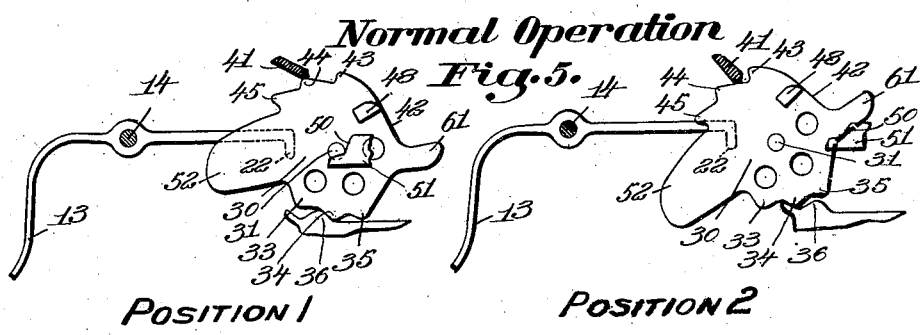
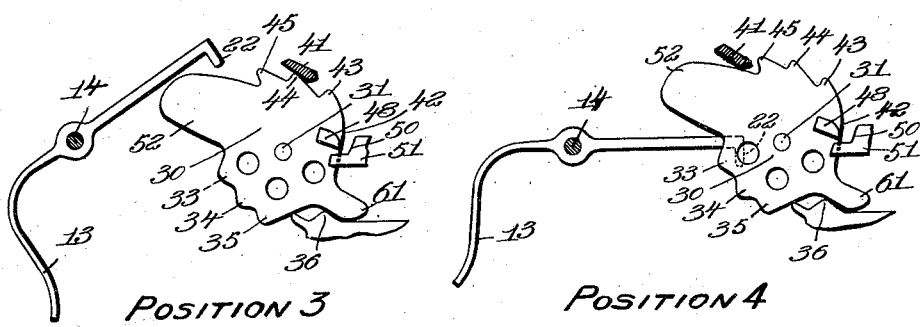
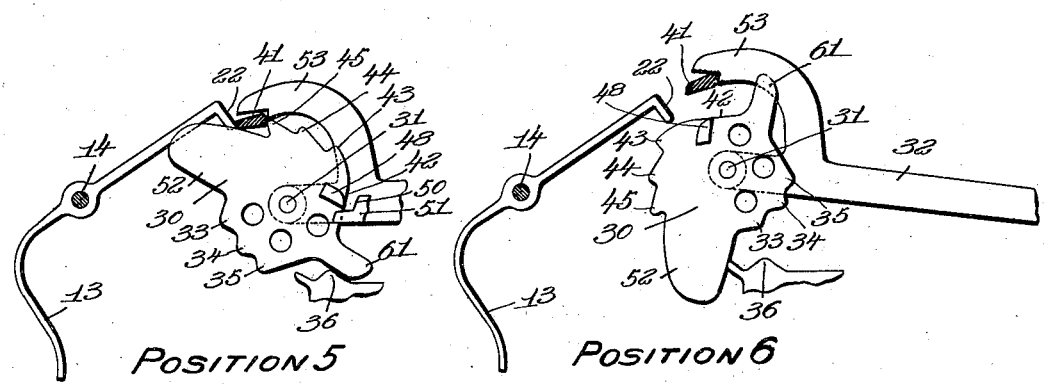

UNITED STATES PATENT OFFICE.

JONAS NORTHROP, OF HOPEDALE, MASSACHUSETTS, ASSIGNOR TO HOPEDALE MANUFACTURING COMPANY, OF HOPEDALE, MASSACHUSETTS, A CORPORATION OF MASSACHUSETTS.

MISTHREADING DEVICE FOR LOOMS.

1,186,931.  Specification of Letters Patent.  Patented June 13, 1916.

Application filed April 17, 1914. Serial No. 832,483.

*To all whom it may concern:*

Be it known that I, JONAS NORTHROP, a citizen of the United States, residing at Hopedale, in the county of Worcester and State of Massachusetts, have invented certain new and useful Improvements in Misthreading Devices for Looms; and I do hereby declare the following to be a full, clear, and exact description of the invention, such as will enable others skilled in the art to which it appertains to make and use the same.

The present invention relates to an improvement in misthreading devices for automatic looms.

In automatic looms the breaking of the filling when a new filling supply is inserted in the shuttle, called a hopper misthread, causes filling absence to be detected upon the next boxing of the shuttle on the detector side of the loom, and the insertion of a new filling supply as a result thereof. It has been proposed to stop the loom upon the occurrence of a single hopper misthread. It has also been proposed to stop the loom upon the occurrence of two hopper misthreads. But in practice it has been found that it is not necessary to the production of good cloth to stop the loom upon the occurrence of one or two hopper misthreads, so one object of this invention is to produce a construction operating upon three consecutive hopper misthreads to stop the loom. It has been proposed to stop the loom when the thread fails to enter the shuttle eye, that is, upon the occurrence of a real misthread. It has also been proposed to stop the loom upon the occurrence of two real misthreads. But the devices which have been used for this purpose have been more or less complicated, and another object of this invention is to produce a misthreading device operating upon the occurrence of one real misthread to stop the loom, of an improved and simplified form.

Another object of the invention is to produce a misthreading device having provision for resetting upon the restoration of the filling supply to normal condition. Thus in the present invention, when the loom is stopped upon the occurrence of three hopper misthreads, or upon the occurrence of one real misthread, or otherwise, and thereafter the filling supply is restored to normal condition and the loom started, the misthreading device will automatically reset itself in normal detecting condition.

Other objects of the invention will be pointed out in connection with the description of the device.

The invention consists in the misthreading device hereinafter described and particularly pointed out in the claims.

In the accompanying drawings illustrating the preferred form of the invention, Figure 1 is a section on the line 1—1 of Fig. 2; Fig. 2 is a plan of a portion of the left hand end of a loom embodying the invention; Fig. 3 illustrates the mode of operation of the misthreading device upon the occurrence of three hopper misthreads, position 1 showing the position of the parts after the indication of filling absence and forward movement of the detector slide, position 2 showing the position of the parts after the return movement of the detector slide, position 3 showing the position of the parts after the detector slide has been moved forward on the indication of a second successive filling absence, position 4 showing the position of the parts after the detector slide has moved back again, position 5 showing the position of the parts after forward movement of the detector slide following the third successive filling absence, position 6 showing the position of the parts after the detector slide has been moved backward again, position 7 showing the position of the parts after the detector slide has been moved forward upon the occasion of the fourth successive indication of filling absence, and position 8 showing the position of the parts after the detector slide has been moved back again; Fig. 4 illustrates the mode of operation of the device upon the occurrence of one real misthread, position 1 showing the position of the parts after the detector slide has been moved forward upon the occasion of the detection of a filling absence, position 2 showing the position of the parts after the detector slide has moved back again, position 3 showing the position of the parts after the occurrence of a real misthread (the detector slide not having been moved forwardly because of the filling indication, but with the star wheel racked forward by the weft hammer pawl), position 4 showing the position of the parts after the rearward movement of the weft hammer pawl, position 5 showing the position of the parts after the forward movement of the detector slide upon the occasion of filling absence, position 6 showing the position of the parts after the detector slide has moved rearwardly again, and position 7 showing the position of the parts during the resetting operation; Fig. 5 illustrates the mode of operation of the device in normal operation of the machine, position 1 showing the position of the parts after the forward movement of the detector slide following filling absence, position 2 showing the position of the parts after the detector slide has returned to rear position, position 3 showing the position of the parts after actuation of the star wheel by the weft hammer pawl, filling having been indicated, position 4 showing the position of the parts after the pawl has moved back to rear position, and positions 5 and 6 showing the resetting operation upon the next forward stroke of the weft hammer pawl.

The illustrated embodiment of the invention is described as follows:

The left hand end of the breast beam 10 is slotted to receive the shipper lever 11 and supports the knock-off lever 12. The filling detector or weft fork 13 is of the ordinary form, being pivotally supported at 14 upon the detector slide 15 mounted on the detector bracket 16 which is secured to the breast beam. The weft hammer lever 20 is oscillated in the usual way and is provided with a hammer or hook 21 to engage the hook 22 on the tail of the fork so as to move the detector slide 15 forward so as to set the filling mechanism in operation in the usual way through the medium of the rock shaft 23 which extends from side to side across the front of the loom. The detector arm 24 mounted on the rock shaft 23 has pivotally attached to it at 25 the lever 32. Whenever the detector slide 15 is pushed forwardly by the means described, the rock shaft running to the filling supply mechanism causes an operation thereof, to effect filling replenishment of the shuttle. The foregoing elements constitute filling supply operating means and operate in the usual manner upon the occurrence of a filling absence to cause the filling supply mechanism to be set in operation, and every time a filling absence is indicated the filling supply mechanism is set in operation and the attempt is made to replenish the supply of filling. But on the occurrence of hopper misthreads, where the thread breaks during the insertion of the filling supply in the shuttle, or upon the occasion of real misthreads when the filling fails to find its way into the eye of the shuttle, a condition of affairs is presented which requires the attention of the operative. To this end a misthreading device forming the subject-matter of this invention is provided which operates upon the occurrence of three hopper misthreads, or one real misthread, to stop the loom. This directs the attention of the operative to the loom so that the trouble with it may be fixed. This misthreading device, in general, consists of a device operating to count the hopper misthreads and upon the occurrence of three of them, to cause the stopping of the loom, or upon the occurrence of one real misthread, to stop the loom. The principal contrivance for controlling these operations is the misthread star wheel 30 which is pivotally mounted upon the stud 31 carried by the lever 32 pivotally supported upon its forward end on the pivot 25 of the detector arm. On its lower side is a series of rack teeth 33, 34, and 35, which engage the teeth of the rack 36 on the detector slide bracket 16. A forward movement of the detector slide, due to the engagement of the weft hammer hook by the weft hammer, turns the star wheel through an angle approximately equal to the sector subtended by one of the rack teeth 33, 34 or 35. The weft hammer pawl 40 is provided with a tooth 41 which rests upon the flat 42 of the star wheel. It will be observed that as long as the weft fork is tipped owing to the presence of filling, the reciprocations of the weft hammer will be ineffective to impart reciprocations to the detector slide, because of the failure of the weft hammer to engage the detector hook, and that the weft hammer pawl tooth 41, sliding back and forth on the flat 42 of the star wheel, will have no tendency to turn the star wheel upon its axis, but when the detector slide is moved forward and the star wheel is turned on its axis, then the pawl teeth 43, 44 and 45 of the star wheel are in position to be engaged by the tooth 41 of the weft hammer pawl 40. Thus when filling absence occurs, the weft hammer 21 pushes the detector slide forward, thereby turning the star wheel upon its axis by reason of the engagement of the rack tooth 33 of the star wheel with the teeth of the rack 36, and the pawl tooth 43 of the star wheel is thereby moved forward clockwise in front of the tooth 41 of the weft hammer pawl 40 which drops behind the tooth 43, then upon the backward movement of the detector slide the tooth 41 of the weft hammer pawl prevents the star wheel from turning anti-clockwise, as a result of which the rack tooth 33 of the star wheel slides over the rear end of the rack and the rack tooth 34 engages the rack. (See Fig. 4, position 2.) Successive forward movements of the detector slide cause the star wheel to be turned through successive angles until the knock-off block 48 is presented to the rear end 50 of the snout 51 of the knock-off lever 12. Then the forward movement of the detector slide causes the knock-off block 48 to force the knock-off lever forward and thereby release the shipper lever 11 and knock off or stop the loom. The star wheel is provided with an extension or resetting weight 52 which, when the wheel is released, operates to turn the wheel upon its pivot so as to restore it to the condition of inoperation illustrated in Fig. 1. This restoration of the star wheel to its condition of inoperation is accomplished by the engagement of the weft hammer pawl with the pawl tooth 45 of the star wheel 30. Now, as the weft hammer moves forward, its pawl is lifted owing to the angularity of the path of motion of the pawl tooth 45. This lifting of the pawl 41 brings it into engagement with the resetting dog 53 on the star wheel carrier 32 and the continued movement of the pawl in forward direction lifts the pawl out of engagement with the tooth 45 of the star wheel and at the same time lifts the star wheel bodily by lifting the star wheel carrier 32, thereby releasing the rack teeth on the lower side of the star wheel from engagement with the rack 36 thereby permitting the resetting weight 52 to turn the wheel into its position of inoperation. When it is desired to throw the stopping mechanism out of operation for any reason, the pawl 40 will be lifted off of the flat 42 of the star wheel and thrown back so that the pin 54 engages the ear 55 on the weft hammer pawl supporting bracket 56.

The foregoing description of the construction of the misthreading device of the present invention has contained only incidental references to the mode of operation of the parts to the extent which is convenient in describing their construction. Reference has not been made to all of the details of construction, as it will be more convenient to refer to them in connection with the following description of the mode of operation of the device in the performance of its intended functions.

The operation of stopping the loom upon the occurrence of three hopper misthreads will be described in connection with Fig. 3. Upon the occurrence of a weft absence, the weft detector will be engaged by the weft hammer and the detector slide will be carried forward to the position illustrated in position 1, the first rack tooth 33 causing the star wheel 30 to be turned to the position shown. This turning of the star wheel will bring the pawl tooth 43 in front of the weft hammer pawl tooth 41, then when the detector slide moves rearward again to the position indicated in position 2 the pawl tooth 41 will hold the star wheel 30 from rotation and cause the rack tooth 33 to slide rearwardly off the rack 36 bringing the second rack tooth 34 into engagement with the rack. The above operation of the detector slide causes an operation of the filling supply mechanism by a turning of the rock shaft 23. Assuming that when the filling supply was inserted in the shuttle the thread broke, causing a hopper misthread, then when the shuttle was thrown to the opposite end of the loom and the lay beat up, filling absence would be indicated by the weft detector and the detector slide would again be carried forward and the parts would occupy the positions indicated in position 3, the second rack tooth 34 turning on the rack 36 and causing the tooth 44 to be moved in front of the pawl tooth 41, as shown. Upon the return or back stroke of the detector slide the pawl tooth 41 would engage the pawl tooth 44 and prevent the star wheel 30 from turning backward, thereby causing the second rack tooth 34 to be moved off the end of the rack 36 into the position illustrated in position 4, thereby bringing the third rack tooth 35 into engagement with the rack. This forward movement of the detector slide causes a second operation of the filling supply mechanism, and assuming that a second hopper misthread occurred with the insertion of the second supply of filling, then when the shuttle was thrown to the opposite side of the loom and the lay beat up, filling absence would be indicated and the weft hammer would for a third time engage the hook of the weft fork and cause a third forward movement of the detector slide, bringing the parts to the positions indicated in position 5, thereby turning the third pawl tooth 45 forward beyond the tooth 41. Upon the return stroke of the detector slide the tooth 41 will engage the pawl tooth 45 and cause the third rack tooth 35 to be moved back over the end of the rack 36, bringing the parts into the position indicated in position 6. This turning of the star wheel 30 to position 5 will bring the knock-off block 48 into the cavity 60 in the upper side of the snout 51 of the knock-off lever. When the backward movement of the detector slide occurs, bringing the parts to position 6, the knock-off block 48 will slide over the end of the snout 51 of the knock-off lever and be in position to engage the rear end 50 of the snout of the knock-off lever. Assuming a fourth operation of the filling supply mechanism to occur, and a third hopper misthread to follow, then the filling detector upon the boxing of the shuttle in the side of the loom opposite the filling supply mechanism, will indicate filling absence, and a fourth successive forward movement of the detector slide will take place, the knock-off block 48 engaging the end 50 of the snout 51 of the knock-off lever, thereby moving the knock-off lever forward and knocking off the loom. The parts will then occupy the position indicated in position 7. The star wheel 30 will not be turned at this reciprocation of the detector slide. The ear 61 will slide along on top of the smooth portion of the rack 36, as shown in position 7, and upon the return stroke, the parts will be brought to the position indicated in position 8, the star wheel 30 will occupy the same position with relation to the rack that it occupied in position 6. With the forward stroke of the detector slide the weft pawl 40 moves forward at the same time, and there being no substantial relative movement between the pawl 40 and the star wheel stud 31, there is no tendency to tip the star wheel so as to cause the engagement of the weft pawl 40 with the resetting dog 53. The loom, therefore, comes to rest with the parts of the detector mechanism occupying the positions illustrated in position 8. The operative now remedies the defect which caused the hopper misthreading and throws the shipper lever into position to start the loom. This moves the knock-off lever rearward and its rear end 51 occupies the position illustrated in position 1.

Upon starting the loom, no misthreading occurring, the weft detector indicates filling presence, and the forward movement of the weft hammer does not engage the hook of the weft filling detector, but the weft pawl 40 engages the third pawl tooth 45 of the star wheel 30 and tips the star wheel up, using the ear 61 as a fulcrum, thereby lifting the pawl 40 and causing it to engage the resetting dog 53 on the star wheel carrier 32 thereby causing the pawl 40 to be lifted off of the star wheel and the star wheel in turn to be lifted by its carrier off of the rack 36, thereby freeing the star wheel and permitting the resetting weight 52 to turn it back to the normal position of inoperation illustrated in Fig. 1. It is to be observed in this connection that if the operative, after three hopper misthreads, should start the loom without remedying the defect which caused the misthreading, the loom would stop upon the next detecting beat. The construction, therefore, has the advantage of stopping the loom but holding the detector apparatus in position immediately to stop the loom in case the defect which caused the misthreading has not been remedied.

The mode of operation of the parts upon the occurrence of one real misthread to stop the loom will be described in connection with Fig. 4. Assuming a filling absence to have been indicated, then upon the first detecting beat of the lay the weft hammer will carry the detector slide forward and bring the parts to position 1 with the pawl 40 back of the pawl tooth 43, then upon the return stroke of the detector slide, the star wheel 30 will be prevented from turning by the pawl 40 and the rack tooth 34 will be engaged with the rack 36. This operation of the parts will be accompanied by an operation of the filling supply mechanism, and it is assumed that a real misthread occurs. Then upon the pick of the shuttle to the opposite side of the loom from the filling supply mechanism, filling presence will be indicated and the weft hammer will fail to engage the hook on the detector, the detector slide will not be moved forward, but the weft pawl tooth 41 will turn the star wheel to the position indicated in position 3, thereby turning the third rack tooth 35 of the star wheel beyond the rack 36, as shown, and upon the retracting or rearward stroke of the weft hammer, the pawl tooth 41 will move to the position indicated in position 4, the star wheel 30 standing fast, being held by its engagement with the rack. Thus the pawl tooth 41 of the weft hammer will retreat over the two pawl teeth 44 and 45 and the knock-off block 48 will be brought into position behind the end 50 of the snout 51 of the knock-off lever. When the shuttle is now thrown again to the filling supply side of the loom, the filling will be broken and upon the next detecting beat of the lay the weft detector will indicate filling absence, and the weft hammer will engage the hook on the weft detector and move the slide forward, thereby knocking off the loom. The parts at the end of this forward movement will occupy position 5. Upon the return stroke of the detector slide, the parts will occupy the positions indicated in full lines in position 6 and the loom will have stopped. If now the loom be started, the knock-off block 48 still standing behind the knock-off lever, the loom will, if filling absence be indicated, be knocked off immediately upon the first detecting beat of the lay, whereas if the eye of the shuttle had been cleared, or if a new shuttle had been substituted for the one which caused the real misthread, the pawl tooth 41 would engage the resetting dog 53 and cause the resetting of the star wheel to normal position of inoperation. This operation is indicated by position 7, which shows the pawl tooth 41 at the end of its forward stroke, the pawl having disengaged itself from the star wheel 30, lifted the resetting dog 53, and thereby lifted the star wheel carrier 32, and so lifted the star wheel off of the rack 36 and permitted it to fall back into the position indicated. The dotted line position of the star wheel, shown in position 6, shows the position which the star wheel occupies after it has turned slightly during the forward movement of the weft pawl, thereby lifting the weft pawl into engagement with the resetting dog, after which the further lifting of the resetting dog causes a disengagement of the pawl from the star wheel, permitting it to fall.

The mode of operation of the parts when the filling supply is exhausted and filling replenishment occurs, is illustrated in Fig. 5. Upon exhaustion of the filling and the detection of filling absence, the first detecting beat of the lay is accompanied by rolling the star wheel over upon the forward stroke of the detector slide, so that the parts occupy the positions indicated in position 1. On the back stroke of the slide the star wheel slips back one tooth and occupies the position indicated in position 2. Filling having been supplied and no misthreading having occurred, upon the next detecting beat of the lay filling presence is indicated and the weft pawl turns the star wheel over to the position indicated in position 3, thereby bringing the knock-off block into position behind the end of the knock-off lever. Upon the retracting stroke of the pawl tooth 41, it is retracted beyond the tooth 45 of the star wheel and the parts occupy the positions shown in position 4. On the next detecting beat of the lay, filling being indicated, the pawl tooth 41 engages the resetting dog 53 and releases the star wheel, thereby resetting the parts. In this connection it is to be observed that the resetting operation is accomplished after two beats of the lay following filling replenishment. This is desirable because it promptly restores the parts to normal position of inoperation.

It is apparent from the foregoing description of the mode of operation of the device upon the occurrence of hopper and real misthreads, and its mode of operation upon the occurrence of a filling exhaustion, that the device causes the stopping of the loom upon the occurrence of three hopper misthreads or one real misthread, and that the loom will be stopped in any event upon the occurrence of one real misthread whether preceded by a hopper misthread or not. This will be understood by reference to position 4 of Fig. 3, which illustrates the return of the parts after one hopper misthread. If now a real misthread follows the hopper misthread, the weft fork will be tilted, and as the lay beats up, the weft pawl engaging the pawl tooth 44 will turn the star wheel on its axis and bring it into practically the position indicated in position 3 of Fig. 4. Upon the next detecting pick of the shuttle, filling absence being indicated, the detector slide will move forward and the knock-off block will strike the end 50 of the knock-off lever and the loom will be stopped. Thus the loom would be stopped after the occurrence of a hopper misthread and one real misthread.

The simplicity of the device, its capacity of prompt self-resetting, and its certainty of operation, commend it.

The invention, viewed in its broader aspects, is not limited to delaying the operation of the stopping mechanism, as it contemplates broadly delaying the operation of other loom appurtenance operating mechanism.

The invention is not limited to the illustrated embodiment, as it may be embodied in other forms within the scope of the following claims:—

1. An automatic loom having, in combination, filling supply operating means, a filling detector, and rotatory means for causing loom stoppage constructed and arranged to stop the loom on the occurrence of three successive hopper misthreads having provision for self-resetting, substantially as described.

2. An automatic loom having, in combination, filling supply operating means, a filling detector, and means for causing loom stoppage constructed and arranged to stop the loom on the occurrence of one real misthread having provision for self-resetting, substantially as described.

3. An automatic loom having, in combination, filling supply operating means, a filling detector, and means for causing loom stoppage constructed and arranged to stop the loom on the occurrence successively of a hopper misthread and a real misthread having provision for self-resetting, substantially as described.

4. An automatic loom having, in combination, a reciprocating part, a filling detector, filling supply operating means, stopping means, and a rotary connection between the filling supply operating means and the stopping means having provision for actuation by the filling supply operating means when filling absence is indicated, and for actuation by the reciprocating part of the loom when filling presence is indicated.

5. An automatic loom having, in combination, filling supply operating means, a filling detector, stopping means, and a rotary stop-delaying device having provision for operation by gravity and also by means acting independent of the operation of the filling supply operating means, substantially as described.

6. An automatic loom having, in combination, filling supply operating means, a filling detector, stopping means, and a ratchet and pawl stop-delaying device having provision for reducing the delay in stopping upon the occurrence of filling absence after filling presence after first actuation of the filling supply operating means, substantially as described.

7. An automatic loom having, in combination, filling supply operating means, a filling detector, stopping means, and a rotary stop-delaying device having provision for actuation by a rack, substantially as described.

8. An automatic loom having, in combination, filling supply operating means, a filling detector, stopping means, a rotary stop-delaying device having provision for rack-and-tooth and pawl actuation, substantially as described.

9. An automatic loom having, in combination, filling supply operating means, a filling detector, and rotary means actuated both by the filling supply operating means and by a reciprocating part of the loom for causing loom stoppage having provision for delaying the stopping for a plurality of attempts of the filling supply operating means to restore the loom to a condition of normal operation, substantially as described.

10. An automatic loom having, in combination, filling supply operating means, a filling detector, stopping means, a stop-delaying device actuated both by the filling supply operating means and by a reciprocating part of the loom having provision for permitting attempts to restore normal operation of the loom for a period of four boxings of the shuttle in the filling replenishing end of the loom and resetting the stop-delaying device, substantially as described.

11. An automatic loom having, in combination, filling supply operating means, a filling detector, means for causing loom stoppage operative after three hopper misthreads and operative after one real misthread, substantially as described.

12. An automatic loom having, in combination, filling supply operating means, a detector slide, a filling detector mounted on the slide, a star wheel carrier connected to the slide, a star wheel mounted on the carrier and participating in the reciprocations of the slide, a detector slide bracket, a stationary rack, a knock-off lever, a weft hammer pawl, the star wheel having a tooth adapted to be engaged by the weft hammer pawl, a tooth adapted to engage the rack, and a portion adapted to engage the knock-off lever, substantially as described.

13. An automatic loom having, in combination, filling supply operating means, a detector slide, a filling detector mounted on the slide, a star wheel, a carrier therefor connected to the slide, a stationary rack, a weft pawl, the star wheel having a flat upon which the weft pawl slides during a condition of normal inoperation, rack teeth and pawl teeth, and a pawl lifting device for disengaging the pawl from the star wheel, substantially as described.

14. An automatic loom having, in combination, filling supply operating means, a filling detector, a detector slide carrying the detector and connected with the filling supply operating means, a star wheel operatively connected with the detector slide, means for carrying the star wheel connected with the slide, a weft hammer pawl for turning the star wheel and for holding it from turning, a rack, said star wheel being provided with a flat adapted to be engaged by the weft hammer pawl during a condition of normal inoperation and with pawl teeth adapted to be engaged by the weft hammer pawl, with rack teeth adapted to engage the rack and with a knock-off portion adapted to engage the knock-off lever, substantially as described.

15. An automatic loom having, in combination, loom appurtenance operating means, a filling detector, connections between it and said appurtenance operating means including a delaying device for delaying the operation of the said appurtenance operating means having provision for reducing the delay upon the occurrence of filling absence after filling presence after first actuation of the filling appurtenance operating means, substantially as described.

16. An automatic loom having, in combination, filling supply operating means, a filling detector, and means for causing loom stoppage on the occurrence of one real misthread and on the occurrence of three hopper misthreads having provision for initiation of actuation upon filling absence indication and continuation of actuation upon filling presence indication as in the case of a real misthread or weft replenishment and slower continued actuation upon filling absence indication as in the case of a hopper misthread, substantially as described.

17. An automatic loom having, in combination, filling supply operating means, a filling detector, and means for causing loom stoppage constructed and arranged to stop the loom on the occurrence of one real misthread and on the occurrence of three hopper misthreads having provision for resetting by the operation of gravity, substantially as described.

18. An automatic loom having, in combination, filling supply operating means, a filling detector, and means for causing loom stoppage constructed and arranged to stop the loom on the occurrence of one real misthread having provision for resetting by the operation of gravity, substantially as described.

19. An automatic loom having, in combination, filling supply operating means, a filling detector, and means for causing loom stoppage constructed and arranged to stop the loom on the occurrence of three hopper misthreads having provision for resetting by the operation of gravity, substantially as described.

20. An automatic loom having, in combination, filling supply operating means, a filling detector, and means for causing loom stoppage including a weft hammer and a stop-delaying device, said hammer operating to actuate said stop-delaying device (1) to stop the loom, (2) to feed the stop-delaying device, and (3) to trip the stop-delaying device to reset the same, substantially as described.

JONAS NORTHROP.

Witnesses:
FRANK E. NORCROSS,
CLARE H. DRAPER.

Copies of this patent may be obtained for five cents each, by addressing the "Commissioner of Patents, Washington, D. C."